United States Patent [19]

Gubitosa et al.

[11] Patent Number: 5,472,926
[45] Date of Patent: Dec. 5, 1995

[54] PROCESS FOR PREPARING A SUPPORTED METAL CATALYST AND CATALYST THEREOF

[75] Inventors: Giuseppe Gubitosa, Novara; Maurizio Giampietri, Trecate; Giuliano Vecchiato, Padova, all of Italy

[73] Assignee: Ministero dell'Universita' e della Ricerca Scientifica e Tecnologica, Rome, Italy

[21] Appl. No.: 50,895

[22] Filed: Apr. 21, 1993

[30] Foreign Application Priority Data

Apr. 23, 1992 [IT] Italy ................... MI92A0966

[51] Int. Cl.⁶ ..................... B01J 37/03; B01J 23/755
[52] U.S. Cl. ............................. 502/337; 502/259
[58] Field of Search ................... 502/259, 337, 502/325, 319, 345, 159

[56] References Cited

U.S. PATENT DOCUMENTS

| | | | |
|---|---|---|---|
| 3,865,853 | 2/1975 | Hinze | 502/159 |
| 4,016,106 | 4/1977 | Sawyer et al. | 502/332 X |
| 4,490,480 | 12/1984 | Lok et al. | 502/315 |
| 4,600,701 | 7/1986 | de Jongh et al. | 502/159 |
| 4,920,090 | 4/1990 | Ritter et al. | 502/439 |
| 5,086,026 | 2/1992 | Chattha et al. | 502/159 |

FOREIGN PATENT DOCUMENTS

| | | |
|---|---|---|
| 0092878 | 11/1983 | European Pat. Off. . |
| 0159101 | 10/1985 | European Pat. Off. . |
| 0317293 | 5/1989 | European Pat. Off. . |
| 0437052 | 7/1991 | European Pat. Off. . |

*Primary Examiner*—Paul Lieberman
*Assistant Examiner*—Douglas J. McGinty
*Attorney, Agent, or Firm*—Rogers & Wells

[57] ABSTRACT

The process for preparing supported metal catalysts comprises the step of suspending, in a solution of a metal compound, a carrier suitable for interacting with said compound, causing a polymer to interact with said carrier and submitting the resulting solid product to thermal treatment.

4 Claims, No Drawings

PROCESS FOR PREPARING A SUPPORTED METAL CATALYST AND CATALYST THEREOF

The present invention relates to a process for preparing supported metal catalysts. More particularly, the present invention relates to a process comprising the steps of suspending, in a solution of a metal compound, a carrier capable of interacting with said compound and submitting the resulting solid product to thermal treatment.

Under the term "metal compound", those soluble salts and complexes of one or more metals are meant, which are normally used in the technology of preparation of supported catalysts, whilst by "thermal treatment", those treatments of drying and calcination are understood which, besides producing metal particles of active element, are suitable for allowing both a rearrangement of the carrier and a transformation of the metal into an oxide thereof and into interaction compounds between metals and carriers, in those cases when the thermal treatment is carried out under a hydrogen stream, to take place.

It is well known that the most required qualities from a catalyst are high values of selectivity and activity. In the case of chemical processes in liquid phase, in which the supported metal catalyst is in the form of a suspended powder in the reaction medium, the causes for a low selectivity and activity of the catalyst may be many, ranging from phenomena of reactant diffusion, to different dispersion patterns of the active phase on the carrier. In particular, in the case of hydrogenation of organic compounds with a high molecular weight, the phenomena of diffusion inside the interior of the pores of the catalyst have a great influence on the selectivity and activity of said catalyst.

The purpose of the present invention is of providing a process for preparing a supported catalyst with high performance in terms of activity and selectivity, and particularly useful in the hydrogenation of high molecular weight organic compounds, such as oils and fats.

A further purpose of the present invention is of increasing the ratio of catalytic component/carrier by modifying the morphology and porous structure of the catalyst in such a way that a higher fraction of active sites are easily accessible to the reactant molecules, with the phenomena of diffusion of reactants and back-diffusion of reaction products towards the interior of the porous structure of catalyst granules being reduced to a minimum.

According to the present invention, such purposes are achieved thanks to the fact that the process for preparing the supported catalyst additionally comprises the addition of a polymer during the course of catalyst preparation.

The polymer to be used is preferably soluble in the liquid used in order to prepare the catalyst.

The suspension to which the polymer is added may be either the suspension deriving from mixing the support with a solution of the metal compound, or a resuspension of the solid material deriving from the interaction between carrier and metal compound, in water or in a suitable solvent.

The interaction between carrier, metal compound and polymer is favoured by a heating of the carrier suspension to which the polymer has been previously added, for a long enough time in order to enable the metal compound to undergo decomposition into susbstantially water insoluble compound, and to cause the polymer to react with the active-element-containing solid product.

The polymer is supposed to interact both with the carrier and with the metal compound, remaining entrapped inside the inorganic mass, and arranging itself parallel to the layer of inorganic solid containing the active element. During the subsequent thermal treatment carried out in order to convert the metal into oxide and metasilicate (which treatment normally is carried out at higher temperatures than 300° C.), the polymer breaks down yielding volatile products with regular channels of medium/large size being probably formed in the residual solid. In the case of a subsequent reduction with hydrogen in order to convert the metal oxide into elemental metal, a supported catalyst is obtained in which the metal particles are thought to be preferably concentrated in the external layer and inside more regular, large size pores, in that way resulting to be more easily accessible to reactant molecules. Such an explanation of the effect deriving from the use of a polymer during the course of the preparation of a supported catalyst should in no way be understood as being limitative of the present invention; it is essentially grounded on the fact that phenomena of reactant and product diffusion into the interior Of the porous structure of the catalyst granules (independently on their geometrical shape) may considerably decrease the catalytic performance. The reduction of the importance of the internal diffusion phenomena taking place inside the catalyst granules implies, besides an increase in activity, also a considerable improvement in selectivity in processes using supported metal catalysts.

The present invention can be applied to any types of metals in particular in those cases when, during the course of catalyst preparation, a major rearrangement of the carrier takes place.

The embodiments of the present invention are many.

According to a particularly advantageous embodiment, an inorganic carrier is suspended in an aqueous solution of a complex of metals (in particular, nickel, cobalt, copper, chrome), in such amounts as to obtain a catalyst containing from 10 to 70% by weight of supported metal. To such a suspension, an aqueous solution of the polymer is subsequently added. Preferably, the polymer is added to the suspension in an amount so as to obtain a ratio of metal/polymer on the carrier, by weight, within the range of from 3 to 11. Very good results were obtained by using polymers with various molecular weight and water soluble such as, e.g., poly(vinyl alcohol) (PVA), polyethylene glycol (PEG), hydroxyethylcellulose, poly(acrylic acid) (APA), polyvinylpyrrolidone (PVP) and polyacrylamide (PAA). In particular, the use is preferred of poly(vinyl alcohol) (PVA) with an average molecular weight comprised within the range of from 15,000 to 100,000. After the addition of the polymer, the suspension is preferably kept with stirring at room temperature, for at least 30 minutes.

Another embodiment of the present invention implies resuspending the solid matter deriving from the interaction between the carrier and the active component in an aqueous solution of the same polymers as cited hereinabove, or, alternatively, in a solution of such polymers as, e.g., poly-(methylmethacrylate) (PMMA), poly-alpha-methylstyrene (PAMS) and methylcollulose, soluble in organic solvents, and heating such a suspension at the refluxing temperature of the liquid media for a time of preferably at least 30 minutes.

A particular and advantageous application of the process according to the present invention relates to the preparation of nickel-based catalysts on fossil meal, used for the hydrogenation of oils and fats and, in particular, for hydrogenating alimentary oils and fats. As known, in this process type, nickel-based catalyst are the most used catalysts.

The hydrogenation process is carried out inside stirred tank reactors, in general in batchwise-mode, and in some cases with a plurality of reactors in cascade, in order that a continuous operations may be carried out. The catalyst, in the solid state, is dispersed throughout the liquid to be hydrogenated, and hydrogen is bubbled through the suspension under the desired pressure. The hydrogenation of fats, according to such a three-step process, mainly aims at increasing the melting point, improving oil stability, and yielding products displaying constant characteristics even when the processes are carried out on different type of raw materials. The activity and, in particular, the selectivity of the catalysts used in this process type are of basic importance, because the quality of the hydrogenated product depends on them. In general, during the course of the hydrogenation, the operator will aim at keeping at very low levels, in the triglyceride, of the component deriving from the complete hydrogenation (stearic acid esters), in favour of products with a high content of mono-unsaturated acids (oleic acid) and, to a lower extent, of dienic acids (linoleic acid).

Furthermore, in order to preserve the high nutritional value of the fat and in order to obtain products with desired rheological properties, it is necessary that the content of trans-isomers is kept at very low levels.

These targets can only be obtained, with the operating process conditions being the same, with catalysts displaying a particular morphology and porous structure, such as those which can be obtained by means of the process according to the present invention.

With reference to the embodiment of the present invention relating to the preparation of the catalyst for hydrogenating either alimentary or industrial oils, the first step of the process comprises preparing a water soluble Ni complex, such as, e.g., $Ni(NH_3)_6Cl_2$ or $Ni(NH_3)_6(OH)_2$. Preferably, the Ni complex used is $Ni(NH_3)_6CO_3$, obtained by starting from metal Ni, $NH_3$, $(NH_4)_2CO_3$ and a stoichiometric amount of $H_2O_2$. The inorganic carrier, e.g., fossil meal (preferably the grade traded by Mainville under the trade name Celite FC) and/or hydrous alumina, is added to the solution of Ni complex. To the resulting carrier suspension an aqueous solution of a polymer is subsequently added with stirring, at room temperature. The suspension is heated up to a temperature close to 100° C. in order to enable the metal complex to undergo complete decomposition into water insoluble compounds.

According to an alternative route, if to the suspension the polymer is not added during this step, the solid resulting from the interaction is separated from its mother liquors and is suspended again ("resuspended") in the polymeric solution according to such modalities as disclosed in the following examples.

The subsequent process steps provide for the solid product to be separated from the mother liquors, said separated solid product to be dried and subsequently calcined at temperatures preferably comprised within the range of from 300° to 600° C., most preferably of from 400° to 600° C., the reduction to be carried out with $H_2$ at temperatures preferably comprised within the range of from 250° to 600° C., most preferably of from 350° to 500° C., and the pyrophoric catalyst so obtained to be protected by means of a fat compatible with the reaction media in which it will be used later on.

During the calcination step, a portion of metal compounds are transformed into oxides supported on metal/carrier interaction compounds, while the polymer is decomposed into volatile products.

During the course of the reduction with hydrogen, most $Ni^{+2}$ is reduced into $Ni^0$ as extremely dispersed metal particles on a solid carrier having high surface area and porosity. In that way, a catalyst is obtained in which metal particles are prevailingly concentrated in the outer layer or inside large-size pores of the carrier, thus resulting more easily accessible to the reactant molecules, with the phenomena of diffusion of both reactants and reaction products into the interior of the porous structure of the catalyst granules being consequently reduced. Such a decrease in internal diffusion phenomena makes it possible considerable improvements in selectivity to be obtained as compared to traditional catalysts.

Lower results, anyway better than as obtainable with the commercial hydrogenation catalysts available at present were obtained by causing the carrier to interact with a solution of $Ni(NH_3)_nCO_3$, in which n is an integer comprised within the range of from 1 to 6, preferably obtained from metal Ni, ammonia, ammonium carbonate and $H_2O_2$. The nickel salt preferably is $Ni(NH_3)_6CO_3$.

In the end process step, i.e., the step of protection of the pyrophoric catalyst from air, a hydrogenated fat is used in amounts comprised within the range of from 50 to 80% by weight. Preferably, 60% by weight of hydrogenated fat with a melting point of approximately 60° C. is used.

Further advantages and characteristics of the process and catalyst according to the present invention will be better understood from the following examples which in no way I shall be construed as being limitative of the scope of the invention.

EXAMPLES 1–3

To 1.2 liters of an aqueous ammonia solution containing 4.72 tools of $NH_3$ and 0.825 tool of $(NH_4)_2CO_3$ monohydrate, 42.73 g of metal Ni powder were added with mechanical stirring. The resulting suspension was heated up to a temperature of approximately 75° C. (which temperature may possibly be comprised within a range of from 50° to 800° C ). When said temperature was reached, to the Ni suspension 100 $cm_3$ were added of a solution at 33% of $H_2O_2$ by volume, at a constant flowrate, such that the temperature of the liquid reaction media never exceeded 80° C. During the course of hydrogen peroxide addition, passes elemental nickel passes in solution as an ammonia complex. The addition of hydrogen peroxide solution was complete within 4 hours.

The solution of Ni complex, of a deep blue colour, was filtered in order to remove any unreacted nickel. The resulting 1,400 $cm^3$ of Ni solution contain 29.21 g of Ni/l; during the chemical attack of metal Ni, 96% of Ni was solubilized as soluble Ni salts. To the resulting solution, 37.1 g of fossil meal were added with strong mechanical stirring, so as to realize a molar ratio of $SiO_2/Ni$ of approximately 0.72, on considering the $SiO_2$ percent content contained in fossil meal.

The suspension was kept with stirring at room temperature for about 30 minutes. Subsequently, to the suspension 200 $cm^3$ of an aqueous solution containing 8 g of poly(vinyl alcohol) (PVA) having an average molecular weight of 15,000 were added. The suspension was then kept with mechanical stirring, at room temperature, for a further 30 minutes. The suspension was then heated in such a way as to increase the temperature thereof up to maximal temperature (100° C.), within an as short as possible time, and preferably within approximately 60 minutes. The suspension was kept at 100° C. for about 4 hours (such a time may vary from 1 to 5 hours, preferably from 3 to 5 hours). During such a step the liquid level inside the reaction vessel, which is open, was kept constant by means of successive replenishments with water.

During the course of the heating, a gradual change occurred in the colour of the suspended solid, which turned from beige into green, and in the solution colour, from blue to colourless. The suspended solid matter was filtered off from the mother liquors. The moist filter cake, of a light green colour, containing approximately 50% of water, was dried at 120° C. for 16 hours inside an air-circulation oven.

The colourless liltrate contains approximately 0.1 ppm of Ni.

After drying, 108.6 g were recovered of a crumbly, easily pulverizable, solid material, 10 g of which were calcined at 400° C. for 2 hours, with a weight loss of 20% being observed. The calcination residue (8 g) was charged to a tubular reactor and was submitted to a reduction process with a flowing stream of $H_2$ (10 liters/hour) at 400° C., for 4 hours.

A pyrophoric, non-magnetic powder of black colour was obtained. During the course of the reduction a weight loss of 16.25% was observed; 6,7 g of the resulting powder were protected with 10.0 g of fat having a melting point of about 60° C.

The most meaningful data relating to the preparation of the catalyst according to the above Example 1 are reported in enclosed Table 1. Still in Table 1, the data are reported which relate to Examples 2 and 3 in which the same operating methodology as of Example 1 was followed (same operating conditions and same reactant amounts) but as regards the amount of PVA. In Example 2, a larger polymer amount was used (12.6 g); and in Example 3 the amount of polymer was halved relatively to Example 1.

EXAMPLE 4

Example 1 was repeated, but the polymer (PVA with an average molecular weight of 15,000) was added to fossil meal before the latter was brought into contact with the Ni containing solution, under the following operating conditions: 18.9 g of fossil meal were suspended in 100 cm³ of water and to the resulting suspension, 80 cm³ of an aqueous solution containing 4.1 g of PVA were added. The suspension was kept with stirring at room temperature for 2 hours. Subsequently, a Ni solution was added, wich was prepared by starting from metal Ni by operating according to as disclosed in Example 1, in such an amount as to yield a molar ratio of $SiO_2/Ni$ of about 0.72, and a weight ratio of Ni/polymer of 5.11. The subsequent procedure was identical to as disclosed in Example 1. The meaningful data are reported in following Table 1.

EXAMPLE 5 (COMPARISON EXAMPLE)

The same methodology of Example 1 was followed, but without adding the polymer. After drying at 120° C. for 16 hours, 104.2 g of a solid product were obtained (4.4 g less than the amount obtained in Example 1). 10 g of dried solid were submitted to calcination at 400° C. for 2 hours, with a weight loss of 16% being obtained (versus 20% in Example 1).

After reduction with $H_2$ under the same conditions as of Example 1, the weight loss was of 15.5% (versus 16.25% of Example 1). The meaningful data are reported in following Table 1.

EXAMPLE 6

Example 1 was repeated with the molar ratio of $SiO_2/Ni$ (=0.25, i.e., a smaller amount of fossil meal) and the weight ratio of polymer/fossil meal (= 0.65, using 8.2 g of PVA having an average molecular weight of 15,000) being varied.

After drying at 120° C. for 16 hours, 87.7 g of product were obtained; 10 g of such a product were calcined at 400° C. for 2 hours, with a weight loss of 25% being observed. After reduction (same operating modalities as of Example 1), the weight loss resulted to be of 24%. The reduction residue was protected with 70% of fat having a melting point of about 60° C. The data are reported in following Table 1.

EXAMPLE 7–8

Example 1 was repeated with the average molecular weight of PVA polymer being varied, i.e. it was of 49,000 and 100,000 respectively. The data are reported in following Table 1.

EXAMPLES 9–10

Example 1 was repeated, but the polymer was added after the step of interaction of fossil meal with Ni solution and before filtering (furthermore, in Example 10, the weight ratio of Ni/polymer was varied), by operating according to the following modalities.

After the heating time of 4 hours at 100° C. had elapsed, the suspension was allowed to settle for approximately 10 minutes, and a portion (250 cm³) of mother liquors was removed by syphoning. To the suspension, 250 cm³ of PVA solution were added (8.3 g and 12.7 g of PVA were used respectively), and the suspension was heated again up to the maximal temperature (100° C.) and was kept at that temperature for 2 hours with mechanical stirring. The suspension is subsequently filtered and the process is continued as in Example 1. The data are reported in following Table 1.

EXAMPLES 11–15

The dried powders obtained according to the same methodologies as disclosed in Examples 1 and 6 were submitted to thermal and reduction treatments at various temperatures, with as many catalysts being obtained. The meaningful data are reported in following Table 2.

EXAMPLES 16–21

Example 1 was repeated by operating with the same amounts of reactants and under identical operating conditions, but with different polymer types: poly(acrylic acid) (APA) with an average molecular weight respectively of 5,000, 200 and 90,000; polyvinylpyrrolidone (PVP) with average molecular weight 10,000, polyethylene glycol (PEG) with average molecular weight 400. The data relevant to catalyst preparation are reported in following Table 3.

EXAMPLES 22–24

These examples relate to the preparation of catalysts with addition of poly-alpha-methylstyrene (PAMS) in cyclohexane solution, according to the following methodology.

After filtering, a portion of the material prepared according to Example 5 was dried at 120° C. for 16 hours. 50 g of such a product were suspended in 500 cm³ of a solution containing 15 g of PAMS in cyclohexane. With mechanical stirring, the suspension was heated up to its refluxing temperature and was kept at that temperature for approximately 3 hours. The suspension was subsequently filtered and the filter cake was dried at 120° C. for 16 hours. The resulting solid matter was then submitted to thermal and reduction treatments at different temperatures. The data relevant to the preparation of the catalyst are reported in following Table 4.

EXAMPLES 25–28

These examples relate to the preparation of catalysts with the addition of low molecular weight polymethylmethacrylate (PMMA) soluble in polar solvent (isobutyl alcohol), according to the same methodology.

The product prepared in Example 5, after the filtering step, and still containing about 50% of water, was suspended in 700 cm$^3$ of isobutyl alcohol and the resulting suspension was heated at 90° C. with mechanical stirring. To the resulting suspension, 200 cm$^3$ of a solution at 90° C., containing 8 g of low molecular weight polymethylmethacrylate (Aldrich 18,223-0) isobutyl alcohol, were then added. The suspension was kept with stirring at its refluxing temperature (about 93° C.) for 2 hours. The suspension was then filtered and the filter cake was dried at 120° C. for 16 hours. The resulting solid material was subsequently submitted to thermal and reduction treatments under different temperature conditions. The data relevant to catalyst preparation are reported in following Table 4.

CATALYTIC TESTS

The catalysts prepared according to Examples 1–28 were submitted to catalytic tests in an autoclave of 1,000 cm$^3$ of capacity, equipped with pressure gauge, mechanical stirrer with 4 inclined blades (maximal revolution speed 1,600 revolutions per minute), baffles, heating system and system for collecting samples for analytical determinations on substrate during the course of the reaction. The autoclave is furthermore connected, through suitable pressure reducing means, with a hydrogen storage tank of known volume equipped with a precision pressure gauge in order to accurately measuring the hydrogen volume consumed during the test.

The purpose of the catalytic tests was of evaluating the activity and selectivity of the catalysts in the hydrogenation of alimentary and industrial oils, according to the following general procedure.

The body of the autoclave is charged with such an amount of catalyst as to operate under kinetic conditions and generally comprised within the range of from 0.10 to 0.45 g, preferably 0.25 g (0.08% by weight relatively to the product to be hydrogenated,. i.e., about 160 ppm of total Ni), and with 300 g of oil to be hydrogenated.

The autoclave is sealed and vacuum-inert gas purges are carried out in order to eliminate air. Heating is then started and within 120 minutes the temperature of the oil to be hydrogenated, under an inert gas blanketing atmosphere, reaches the desired temperature value (160° C.). At such a temperature, the inert gas is replaced by hydrogen, the pressure is adjusted at 2 bars and the autoclave is connected with the hydrogen tank. Then, stirring is started at 1,380 revolutions per minute, with the consumed hydrogen volume being monitored. The activity results are expressed as consumed hydrogen mols per hour per Ni g present in the reaction media.

As regards the selectivity, when the iodine index of the product is close to the desired value, generally equal to 80 (based on consumed hydrogen volume), from the autoclave reaction product samples are collected in order to determine the contents of saturated, unsaturated and cis-trans acids by gas-chromatography after preliminarily transforming, via transesterification, the glycerol esters into methyl esters.

The data relevant to the catalytic tests are reported in following Tables 5 and 6, in which the catalysts are identified by means of the same number as of the examples by means of which their preparation was illustrated.

From the examination of the results of the catalytic tests, the increase is evident in the activity of the catalysts obtained by means of the process according to the present invention, in particular for values of Ni/polymer weight ratio of round 5. Extremely good results, also in terms of selectivity, were obtained when PVA, APA, PMMA and PAMS were used.

TABLE 1

| Example | Molar SiO$_2$/Ni Ratio | Polymer, Average Molecular weight | | Ni/Polymer ratio (by weight) | Calcination Temp. (°C.) | Calcination weight loss (weight %) | Reduction temperature (°C.) | Reduction weight loss (weight %) |
|---|---|---|---|---|---|---|---|---|
| 1 | 0.72 | PVA | 15,000 | 5.11 | 400 | 20 | 400 | 16.2 |
| 2 | 0.72 | PVA | 15,000 | 3.34 | 400 | 15 | 400 | 13 |
| 3 | 0.72 | PVA | 15,000 | 10.18 | 400 | 14 | 400 | 14 |
| 4 | 0.72 | PVA | 15,000 | 5.11 | 400 | 13 | 400 | 9.2 |
| 5 | 0.72 | | | | 400 | 16 | 400 | 15.5 |
| 6 | 0.25 | PVA | 15,000 | 5.11 | 400 | 25 | 400 | 24 |
| 7 | 0.72 | PVA | 49,000 | 5.11 | 400 | 17 | 400 | 10.8 |
| 8 | 0.72 | PVA | 100,000 | 5.11 | 400 | 16 | 400 | 10.7 |
| 9 | 0.72 | PVA | 15,000 | 5.11 | 400 | 16 | 400 | 13.1 |
| 10 | 0.72 | PVA | 15,000 | 3.34 | 400 | 15 | 400 | 11 |

TABLE 2

| Example | Preparate of Example No. | Calcination temperature (°C.) | Calcination weight loss (% by weight) | Reduction temperature (°C.) | Reduction weight loss (% by weight) |
|---|---|---|---|---|---|
| 11 | 1 | 500 | 22 | 400 | 12.8 |
| 12 | 1 | 400 | 21 | 350 | 10.1 |
| 13 | 1 | 400 | 22 | 500 | 15.4 |
| 14 | 6 | 400 | 25 | 350 | 22.6 |
| 15 | 6 | 400 | 25 | 300 | 21.0 |

TABLE 3

| Example | Molar SiO$_2$/Ni Ratio | Polymer, Average Molecular weight | | Ni/Polymer ratio (by weight) | Calcination Temp. (°C.) | Calcination weight loss (weight %) | Reduction temperature (°C.) | Reduction weight loss (weight %) |
|---|---|---|---|---|---|---|---|---|
| 16 | 0.72 | APA | 5,000 | 5.11 | 400 | 28 | 400 | 11.1 |
| 17 | 0.72 | APA | 5,000 | 5.11 | 500 | 29.3 | 400 | 10.9 |
| 18 | 0.72 | APA | 2,000 | 5.11 | 400 | 25 | 400 | 9.3 |
| 19 | 0.72 | APA | 90,000 | 5.11 | 400 | 21 | 400 | 12.7 |
| 20 | 0.72 | PVP | 10,000 | 5.11 | 400 | 18 | 400 | 12.2 |
| 21 | 0.72 | PEG | 400 | 5.11 | 400 | 16 | 400 | 14.3 |

TABLE 4

| Example | Molar SiO$_2$/Ni Ratio | Polymer, Average Molecular weight | | Ni/Polymer ratio (by weight) | Calcination Temp. (°C.) | Calcination weight loss (weight %) | Reduction temperature (°C.) | Reduction weight loss (weight %) |
|---|---|---|---|---|---|---|---|---|
| 22 | 0.72 | PAMS | 81,000 | 1.25 | 400 | 25.3 | 400 | 23.2 |
| 23 | 0.72 | PAMS | 81,000 | 1.25 | 500 | 27 | 400 | 13.7 |
| 24 | 0.72 | PAMS | 81,000 | 1.25 | 400 | 27 | 500 | 16.4 |
| 25 | 0.72 | PMMA | LMW | 5.11 | 400 | 13 | 400 | 11.5 |
| 26 | 0.72 | PMMA | LMW | 5.11 | 500 | 13 | 400 | 10.3 |
| 27 | 0.72 | PMMA | LMW | 5.11 | 600 | 6 | 400 | 10.8 |
| 28 | 0.72 | PMMA | LMW | 5.11 | 400 | 12 | 500 | 14.8 |

TABLE 5

| Catalyst | Ni % in the catalyst | ACTIVITY (mol of H$_2$/ hour.g of Ni) | SELECTIVITY | | | | | | | Total trans- acid % |
|---|---|---|---|---|---|---|---|---|---|---|
| | | | Palmitic acid, % | Stearic acid, % | (Trans) elaidinic acid, % | Oleic acid, % | Linol- elaidinic acid, % | Linoleic acid, % | Linolenic acid, % | |
| 1 | 19.70 | 11.8 | 11.46 | 13,87 | 26.59 | 34.52 | 3.34 | 8.99 | 0.46 | 29.93 |
| 2 | 21.36 | 5.6 | 11.97 | 31.38 | 9.47 | 20.29 | 1.8 | 23.21 | 1.95 | 10.27 |
| 3 | 19.75 | 8.6 | 12.10 | 25.33 | 14.30 | 26.87 | 2.22 | 17.58 | 1.21 | 16.49 |
| 4 | 21.80 | n.a. | | N.D. | | | | | | N.D. |
| 5 | 22.00 | 5.1 | 12.14 | 21.37 | 18.41 | 30.10 | 3.44 | 14.08 | 0.43 | 21.85 |
| 6 | 25.00 | 6.9 | 11.46 | 13.97 | 22.24 | 36.96 | 3.86 | 10.91 | 0.57 | 26.10 |
| 7 | 21.02 | 9.1 | 11.69 | 23.14 | 17.69 | 29.24 | 2.60 | 14.58 | 0.82 | 20.29 |
| 8 | 21.25 | 8.3 | 12.07 | 26.40 | 13.71 | 25.14 | 0.83 | 19.82 | 1.99 | 14.54 |
| 9 | 21.52 | 10.1 | 11.50 | 14.91 | 22.64 | 33.62 | 2.73 | 11.92 | 0.70 | 25.37 |
| 10 | 21.06 | 4.9 | 12.10 | 32.15 | 9.87 | 20.06 | 1.64 | 22.48 | 1.61 | 11.51 |
| 11 | 22.82 | 10.4 | 11.53 | 17.19 | 20.04 | 33.08 | 3.10 | 14.15 | 0.65 | 23.14 |
| 12 | 21.20 | 12.4 | 11.77 | 17.35 | 23.30 | 31.03 | 3.24 | 12.38 | 0.66 | 26.54 |
| 13 | 22.82 | 12.5 | 11.97 | 10.26 | 25.49 | 40.14 | 4.20 | 7.46 | 0.32 | 29.69 | n.a. = Not active; N.D. = Not determined

TABLE 6

| Catalyst | Ni % in the catalyst | ACTIVITY (mol of $H_2$/ hour.g of Ni) | SELECTIVITY | | | | | | | |
|---|---|---|---|---|---|---|---|---|---|---|
| | | | Palmitic acid, % | Stearic acid, % | (Trans) elaidinic acid, % | Oleic acid, % | Linol- elaidinic acid, % | Linoleic acid, % | Linolenic acid, % | Total trans- acid % |
| 14 | 24.5 | 7.0 | 12.07 | 16.55 | 21.47 | 33.56 | 3.31 | 12.02 | 0.76 | 24.78 |
| 15 | 23.8 | 6.4 | 11.88 | 22.48 | 18.46 | 28.76 | 3.06 | 14.26 | 0.90 | 21.52 |
| 16 | 18.1 | 7.6 | 11.50 | 12.64 | 23.93 | 38.46 | 6.07 | 6.83 | 0.38 | 30.00 |
| 17 | 18.4 | 6.5 | 11.48 | 12.02 | 22.47 | 39.32 | 6.69 | 7.05 | 0.39 | 29.2 |
| 18 | 19.5 | 10.5 | 11.60 | 10.61 | 23.74 | 41.42 | 6.00 | 5.99 | 0.42 | 29.74 |
| 19 | 15.8 | 8.9 | 11.48 | 17.59 | 18.60 | 34.29 | 4.87 | 12.68 | 0.46 | 23.47 |
| 20 | 20.6 | 7.1 | 12.10 | 29.25 | 12.50 | 21.91 | 1.04 | 21.56 | 1.46 | 13.26 |
| 21 | 21.8 | 2.7 | 11.70 | 27.35 | 14.50 | 24.19 | 2.41 | 18.12 | 1.47 | 16.91 |
| 22 | 20.8 | 11.0 | 11.90 | 10.67 | 23.42 | 40.20 | 4.82 | 8.27 | 0.48 | 28.24 |
| 23 | 23.1 | 7.0 | 11.70 | 13.00 | 22.72 | 39.48 | 4.80 | 8.00 | 0.20 | 27.52 |
| 24 | 23.8 | 9.8 | 11.50 | 9.14 | 23.48 | 44.18 | 4.69 | 6.47 | 0.36 | 28.17 |
| 25 | 19.1 | 8.5 | 11.90 | 20.88 | 18.89 | 29.97 | 3.36 | 14.04 | 0.63 | 22.25 |
| 26 | 21.4 | 9.2 | 11.57 | 13.11 | 23.58 | 38.24 | 4.76 | 8.12 | 0.33 | 30.34 |
| 27 | 21.9 | 8.0 | 11.56 | 11.90 | 22.62 | 40.65 | 5.85 | 7.00 | 0.26 | 28.47 |
| 28 | 22.3 | 12.7 | 11.70 | 11.10 | 26.30 | 38.19 | 4.50 | 7.54 | 0.37 | 30.80 |

We claim:

1. A process for producing a supported metal catalyst which comprises:
   (a) heating a suspension comprising an aqueous solution of (i) a metal complex selected from the group consisting of $Ni(NH_3)_6Cl_2$, $Ni(NH_3)_6(OH)_2$, and $Ni(NH_3)_6CO_3$, (ii) a carrier capable of interacting with the metal complex, and (iii) a polymer capable of interacting both with the carrier and the metal in the metal complex once the complex has decomposed, so as to decompose the metal complex and thereby form a water-insoluble compound, wherein the polymer is selected from the group consisting of polyvinyl alcohol, polyethylene glycol, methylcellulose, hydroxymethylcellulose, polyacrylic acid, polyvinylpyrrolidone, polyacrylamide, and poly-alpha-methylstyrene, and
   (b) calcining the water-insoluble compound at a temperature of at least 400° C. thereby producing a supported metal catalyst,
   wherein the amounts of metal complex, carrier, and polymer in the suspension are such that the concentration of metal in the supported metal catalyst is from 10% to 70% by weight, and the quantity of the polymer is such that the metal/polymer ratio in the supported metal catalyst is within the range of 3 to 11 by weight.

2. The process of claim 1, wherein the waterinsoluble compound is calcined at a temperature of 400° C. to 600° C., and wherein the supported metal catalyst is further treated with hydrogen at a temperature of from 250° C. to 600° C.

3. A supported metal catalyst produced by a process comprising:
   (a) heating a suspension comprising an aqueous solution of (i) a metal complex selected from the group consisting of $Ni(NH_3)_6Cl_2$, $Ni(NH_3)_6(OH)_2$, and $Ni(NH_3)_6CO_3$, (ii) a carrier capable of interacting with the metal complex, and (iii) a polymer capable of interacting both with the carrier and the metal in the metal complex once the complex has decomposed, so as to decompose the metal complex and thereby form a water-insoluble compound, wherein the polymer is selected from the group consisting of polyvinyl alcohol, methylcellulose, hydroxymethylcellulose, polyacrylic acid, polyvinylpyrrolidone, polyacrylamide, and poly-alpha-methylstyrene, and
   (b) calcining the water-insoluble compound at a temperature of at least 400° C. thereby producing a supported metal catalyst,
   wherein the amounts of metal complex, carrier, and polymer in the suspension are such that the concentration of metal in the supported metal catalyst is from 10% to 70% by weight, and the quantity of the polymer is such that the metal/polymer ratio in the supported metal catalyst is within the range of 3 to 11 by weight.

4. The process of claim 1, wherein the polymer is polyvinyl alcohol having an average molecular weight of from 15,000 to 100,000.

* * * * *